(12) United States Patent
Ichikawa

(10) Patent No.: US 11,687,287 B2
(45) Date of Patent: Jun. 27, 2023

(54) CONTROL APPARATUS AND INFORMATION PROCESSING SYSTEM

(71) Applicant: CANON KABUSHIKI KAISHA, Tokyo (JP)

(72) Inventor: Masanori Ichikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/488,090

(22) Filed: Sep. 28, 2021

(65) Prior Publication Data

US 2022/0100429 A1     Mar. 31, 2022

(30) Foreign Application Priority Data

Sep. 30, 2020   (JP) ................... 2020-166331

(51) Int. Cl.
*G06F 3/06*     (2006.01)
(52) U.S. Cl.
CPC .......... *G06F 3/0659* (2013.01); *G06F 3/0604* (2013.01); *G06F 3/0658* (2013.01); *G06F 3/0688* (2013.01)

(58) Field of Classification Search
CPC .... G06F 3/0604; G06F 3/0613; G06F 3/0658; G06F 3/0659; G06F 3/067; G06F 3/0688
See application file for complete search history.

(56) References Cited

FOREIGN PATENT DOCUMENTS

JP     2019075104 A     5/2019

*Primary Examiner* — Yong J Choe
(74) *Attorney, Agent, or Firm* — Canon U.S.A., Inc. IP Division

(57) ABSTRACT

A control apparatus that is connected to a host controller, a first storage unit, and a second storage unit, and that is configured to perform mirror control of the first storage unit and the second storage unit, allocates in order readout requests accepted from the host controller as a readout request corresponding to the first storage unit or a readout request corresponding to the second storage unit, reads out data from the first storage unit and the second storage unit based on at least one allocated readout request, and transmits the readout data to the host controller.

15 Claims, 13 Drawing Sheets

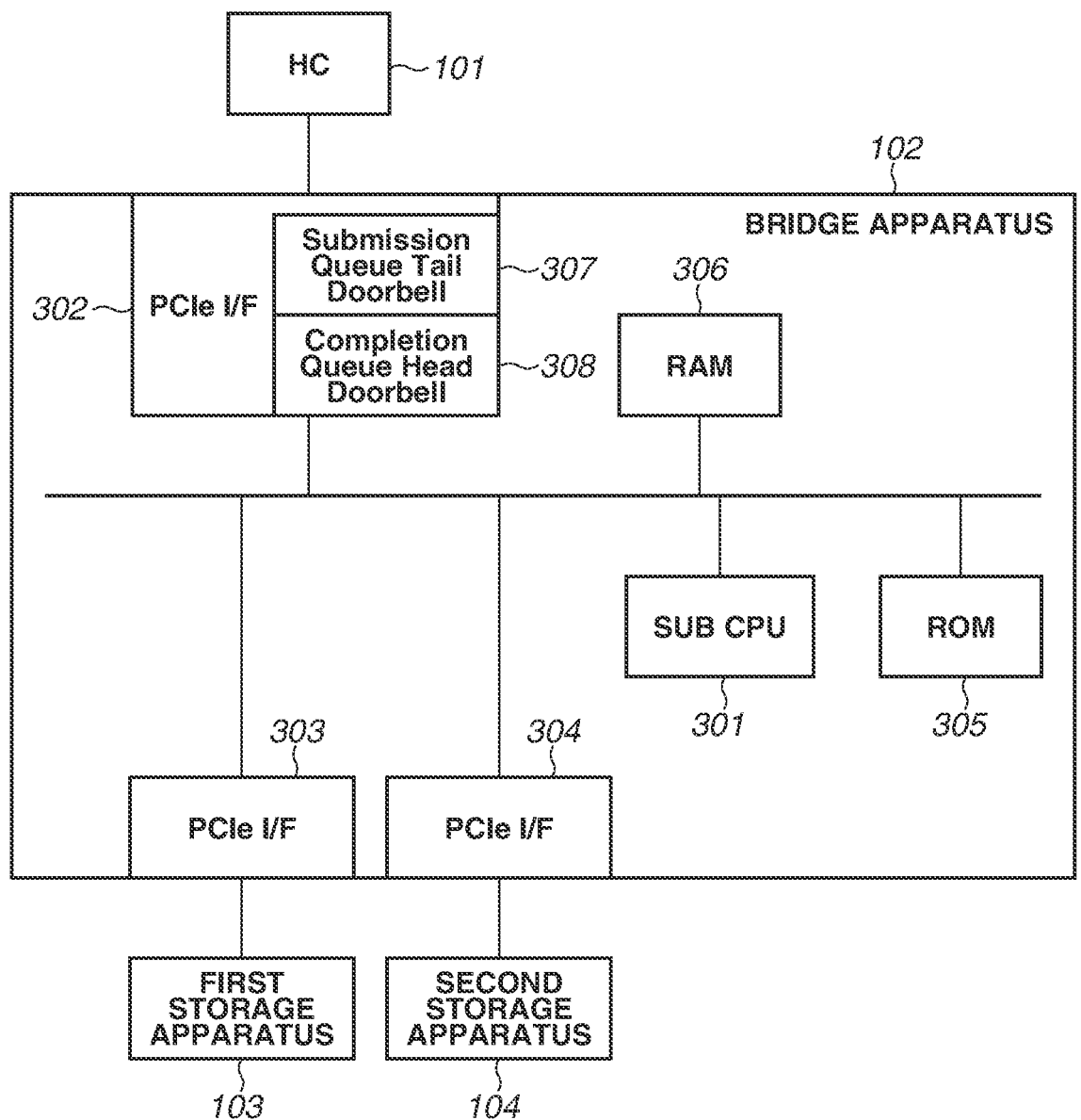

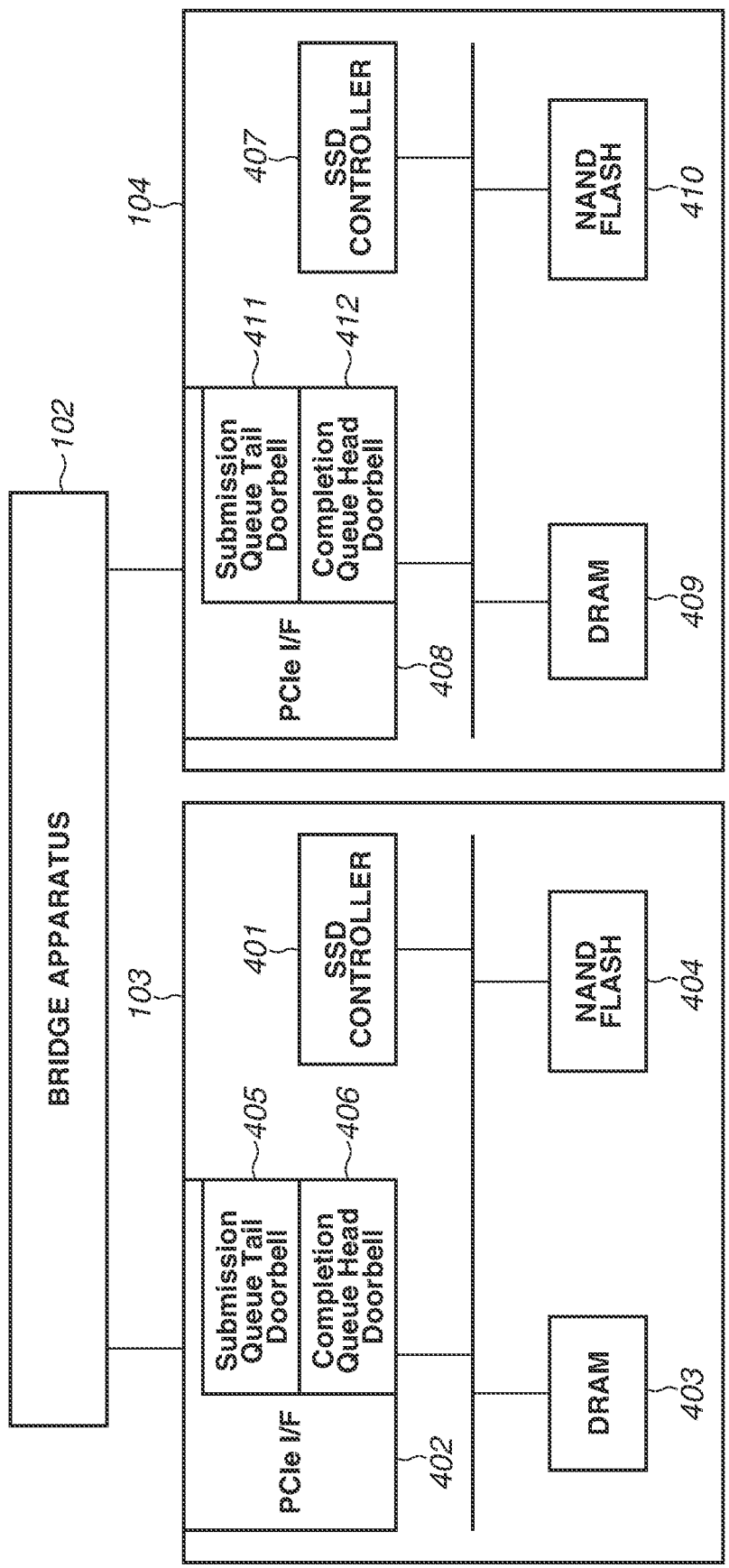

801
COMMAND MANAGEMENT TABLE FOR FIRST STORAGE APPARATUS

| COMMAND TYPE | CQ POINTER |
|---|---|
| READ | HEAD+0 |
| READ | HEAD+2 |
| WRITE | HEAD+3 |
| | |
| | |
| | |
| | |

802
COMMAND MANAGEMENT TABLE FOR SECOND STORAGE APPARATUS

| COMMAND TYPE | CQ POINTER |
|---|---|
| READ | HEAD+1 |
| WRITE | HEAD+3 |
| | |
| | |
| | |
| | |
| | |

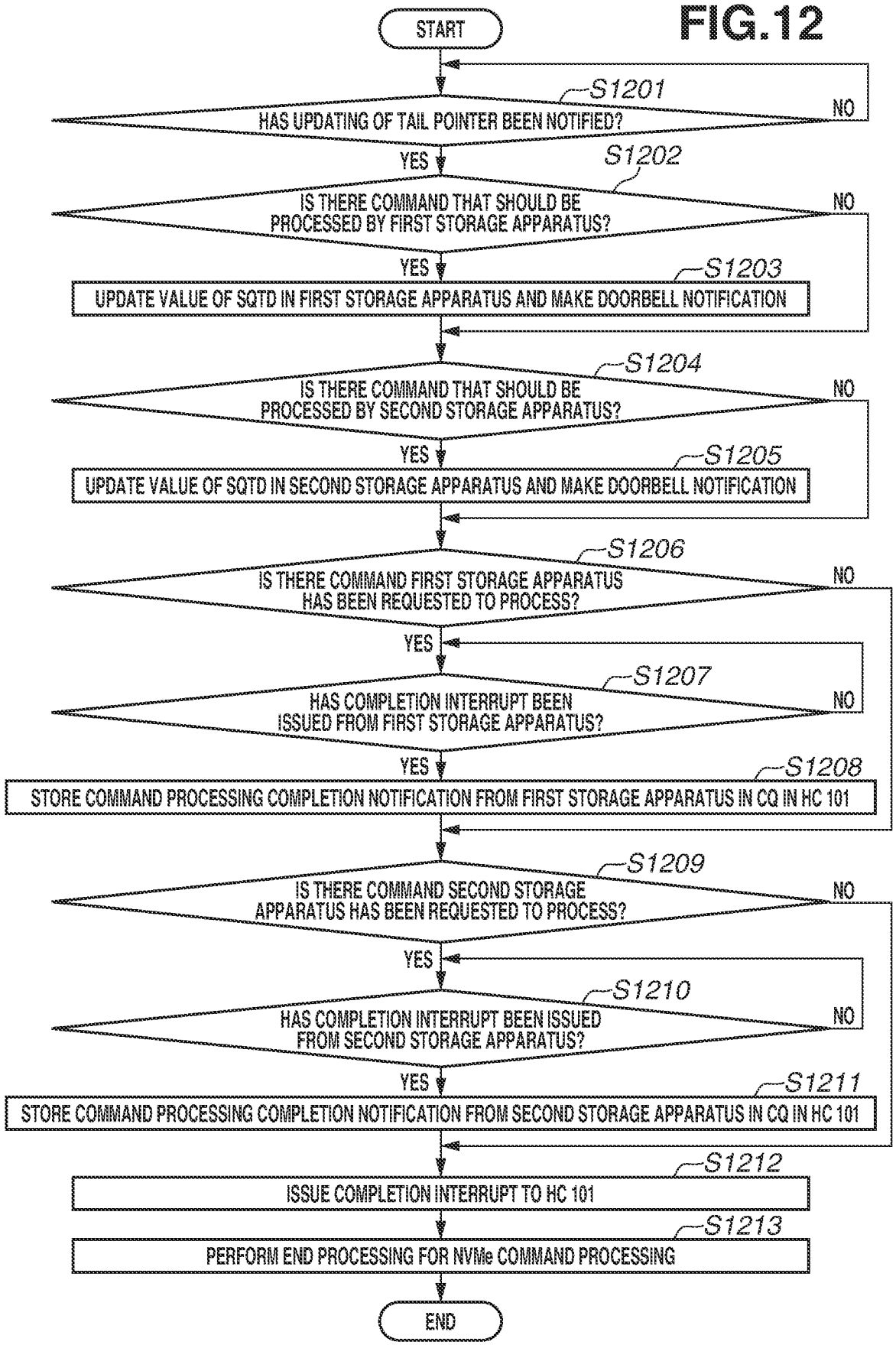

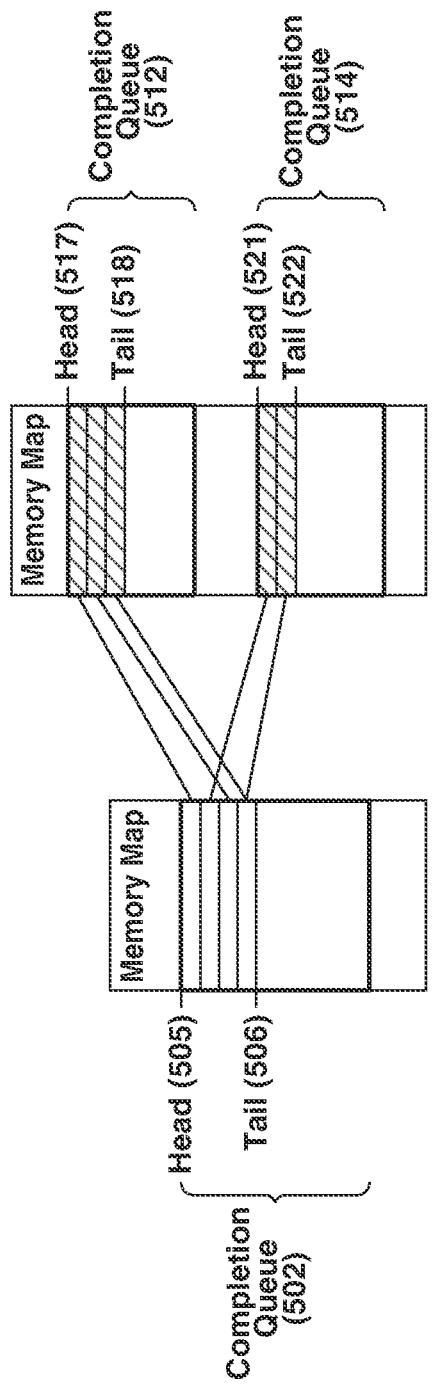

CONTROL APPARATUS AND INFORMATION PROCESSING SYSTEM

BACKGROUND

Field

The present disclosure relates to a control apparatus and an information processing system.

Description of the Related Art

In an information processing apparatus, such as a personal computer (PC), a solid state drive (SSD) utilizing a non-volatile memory has lately taken the place of a hard disk drive (HDD), and the information processing apparatus has thus become capable of performing higher speed data transfer. Meanwhile, since a Serial Advanced Technology Attachment (SATA), which is an interface used in such a storage apparatus, imposes a large physical overhead (the overhead required for data encoding performed at the time of data transfer), and causes long latency, the SSD is unable to achieve its originally intended data transfer performance. In recent years, an SSD that can be directly connected to a Peripheral Component Interconnect Express (PCIe), which is a general-purpose bus, and that supports a Non-Volatile Memory Express (NVMe) protocol has begun to be used. The NVMe protocol is a new protocol that takes advantage of high-speed performance of the SSD.

In addition, as a mechanism for protecting data from a failure of a storage medium, such as the HDD and the SSD, a mirroring technique has been developed for doubling data using two storage apparatuses to store the data. With such mirroring, data from a host is simultaneously recorded in two storage apparatuses using a bridge apparatus. Thus, even if data or a storage apparatus itself becomes broken, the mirroring enables restoration of data from the other storage apparatus.

A bridge apparatus according to the technique of Japanese Patent Application Laid-Open No. 2019-75104 receives a first request set from an application implemented in a host computer with a first interface using a Non-Volatile Memory Express Over Fabrics (NVMe-oF)(or NVMe) protocol. Thereafter, the bridge apparatus generates a second request set based on the first request set, and transmits the second request set to a storage apparatus with a second interface using the NVMe protocol.

In a case where a mirroring system is configured with the bridge apparatus described in Japanese Patent Application Laid-Open No. 2019-75104, the mirroring system includes a transfer path 1 between the host computer and the bridge apparatus and a transfer path 2 between the bridge apparatus and the storage apparatus, as read access paths. Comparing the two transfer paths, the transfer path 2 generally has a narrow bandwidth and thus the transfer speed is slow. As a result, there is a possibility that the transfer path 2 cannot achieve a transfer speed that is commensurate with the transfer speed corresponding to a bandwidth being used for the transfer path 1.

SUMMARY

Various embodiments of the present disclosure provide improvements of a data transfer bandwidth between a host and a bridge apparatus, in connection with a bridge apparatus that forms a mirroring system by acting as a relaying apparatus between a host and a storage apparatus.

Further features of the present disclosure will become apparent from the following description of example embodiments with reference to the attached drawings.

BRIEF DESCRIPTION OF THE DRAWINGS

FIG. 3 is a block diagram of a bridge apparatus of the information processing apparatus according to one embodiment.

FIG. 4 is a block diagram of a storage apparatus of the information processing apparatus according to one embodiment.

FIG. 8 is a command management table according to one embodiment.

FIG. 12 is a flowchart illustrating the flow of processing executed by the bridge apparatus from making a notification to the storage apparatus to making a completion notification from the storage apparatus to the HC according to one embodiment.

FIGS. 13A and 13B are schematic diagrams each illustrating an example of a correspondence relationship of a command processing completion notification according to one embodiment.

DESCRIPTION OF THE EMBODIMENTS

Various example embodiments of the present disclosure will be described in detail below with reference to the accompanying drawings. The following example embodiments do not limit the claimed invention, and not all combinations of features described in each example embodiment are necessarily essential to a means for solving the issues of the present disclosure. The present example embodiment will be described using an image processing apparatus as an example of an information processing apparatus. However, the invention is not limited to image processing apparatuses.

<Description of Overall Configuration of Mirroring System According to Example Embodiment>

Figure 1:
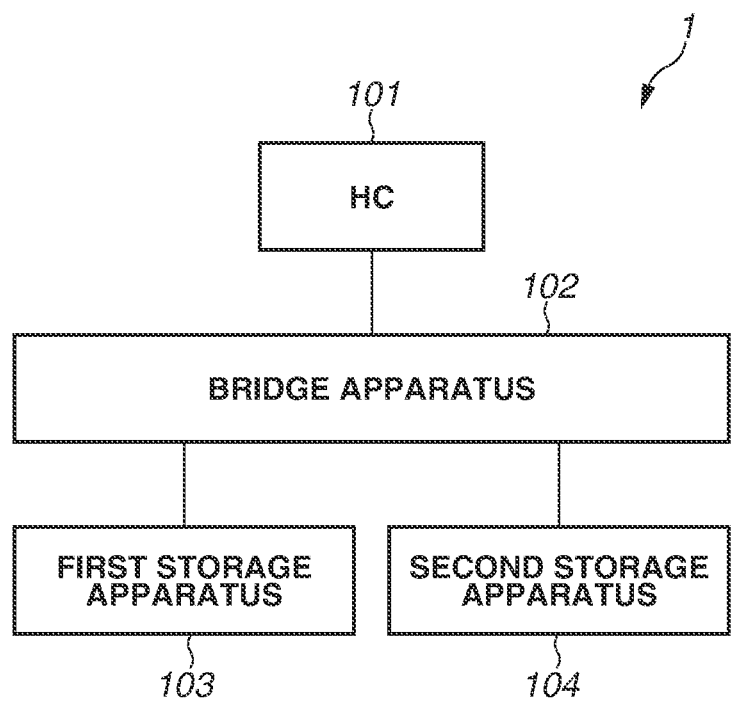
FIG. 1 is a block diagram illustrating a system configuration of an information processing apparatus according to one embodiment.

FIG. 1 is a block diagram illustrating a configuration of an information processing system (mirroring system) according to the present example embodiment.

An information processing system 1 includes a host controller (hereinafter referred to as an HC) 101, a bridge apparatus 102, a first storage apparatus 103, and a second storage apparatus 104.

The HC 101 is connected to the bridge apparatus 102, and functions as a main controller that controls the whole of the bridge apparatus 102. In the present example embodiment, the HC 101 is, for example, capable of controlling an image forming function, such as a print function and a scan function.

The bridge apparatus 102 is connected to the HC 101, the first storage apparatus 103, and the second storage apparatus 104, and performs mirror control of doubling data that is to be stored in the first storage apparatus 103 from the HC 101 and storing the data in the second storage apparatus 104. The mirror control is one of control with mirroring performed by the bridge apparatus 102 to control a plurality of storage apparatuses.

The first storage apparatus 103, which is a solid state drive (SSD), is connected to the bridge apparatus 102, and stores therein system software used in the HC 101, user data, application data, and the like. Furthermore, the first storage apparatus 103 stores therein image data read by a scanner 207, which will be described below, image data accepted from an information processing apparatus, which is not illustrated, via a network, and other data.

The second storage apparatus 104, which is an SSD, is connected to the bridge apparatus 102, and stores therein backup data obtained by doubling data in the first storage apparatus 103.

<Description of Block Configuration of HC 101>

Figure 2:
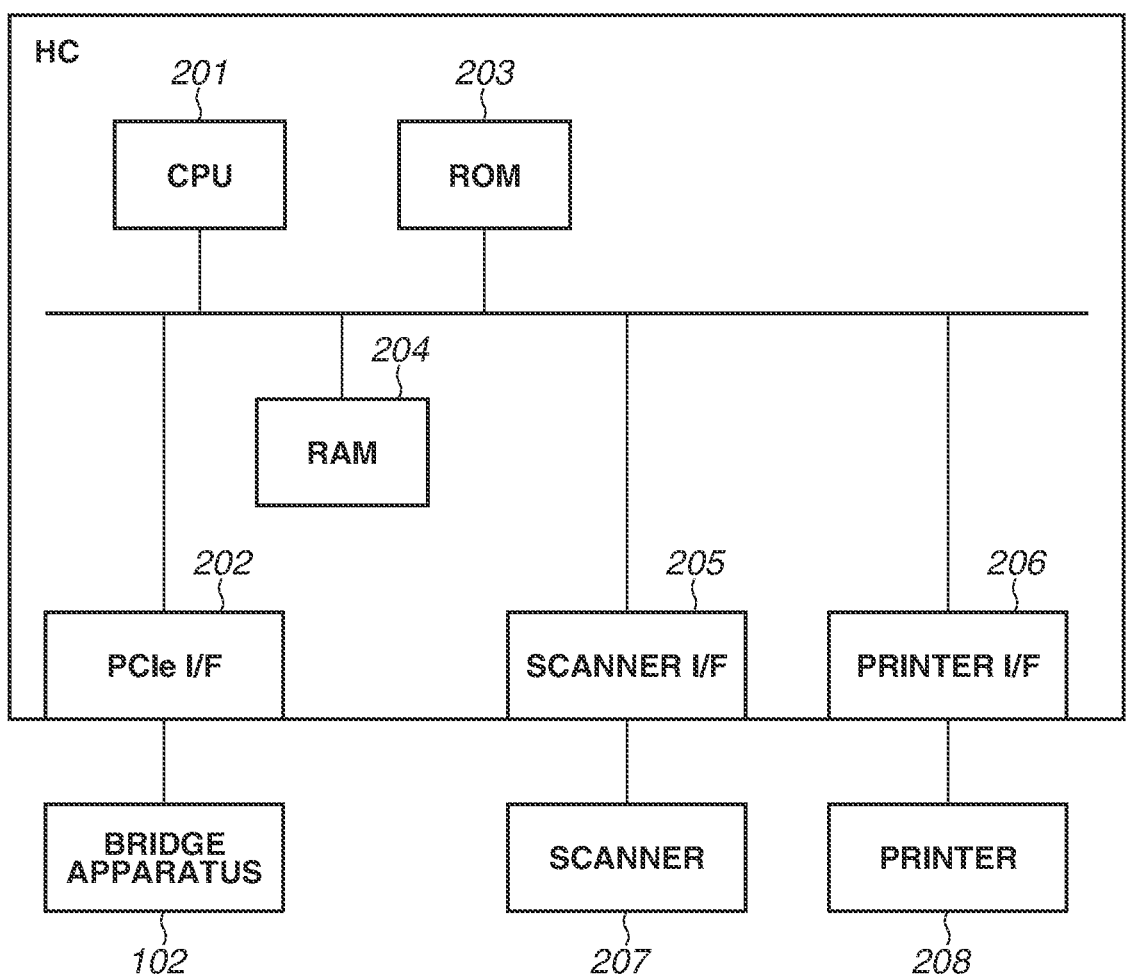
FIG. 2 is a block diagram of a host controller (HC) of the information processing apparatus according to one embodiment.

FIG. 2 is a detailed block diagram of the HC 101.

The HC 101 includes a central processing unit (CPU) 201, a Peripheral Component Interconnect Express-interface (PCIe-IF) 202, a read-only memory (ROM) 203, and a random-access memory (RAM) 204, and is connected to the bridge apparatus 102 via the PCIe-IF 202.

The CPU 201 controls access to various kinds of devices connected thereto based on a control program or the like stored in the ROM 203, and also controls various kinds of processing executed by the HC 101.

The PCIe-IF 202 is an interface in conformity with the PCIe standard, and exchanges data with the bridge apparatus 102, the bridge apparatus 102 serving as an endpoint.

A scanner interface (I/F) 205 is an interface for communication with the scanner 207. A printer I/F 206 is an interface for communication with a printer 208. The scanner 207 optically reads an image from a document, and generates image data. The printer 208 forms an image on a recording medium (paper) in accordance with an electro-photographic method.

The ROM 203, which is a non-volatile memory, stores therein a boot program, a control program, and the like.

Figure 5A:
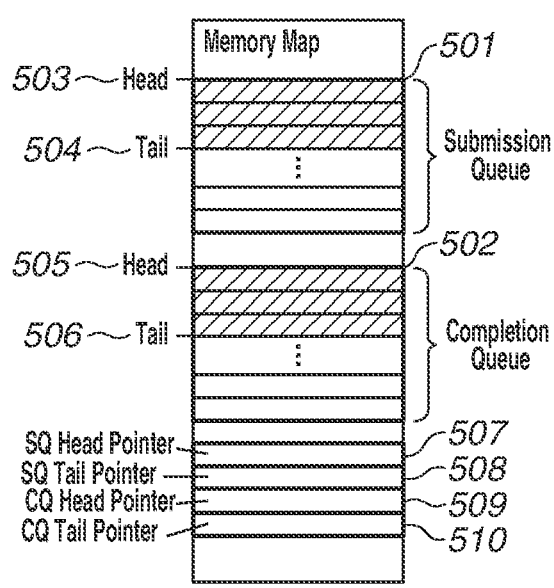
FIGS. 5A and 5B are schematic diagrams illustrating a memory map of the HC and the bridge apparatus according to one embodiment.

The RAM 204, which is a memory such as a dynamic random access memory (DRAM), temporarily stores therein data, and functions as a work memory. An example of a memory map (holding area) of the RAM 204 is illustrated in FIG. 5A. A memory space of the RAM 204 includes a submission queue (hereinafter referred to as SQ) 501 and a completion queue (hereinafter referred to as CQ) 502, which are used in a Non-Volatile Memory Express (NVMe) protocol.

The SQ 501 is a queue in the form of a ring buffer generated in the RAM 204, and NVMe commands generated by the CPU 201 are stored in order in the SQ 501 to exchange the NVMe commands. That is, the SQ 501 is capable of holding a plurality of commands.

A head element of the queue is managed by a head pointer 507 (503), and a tail element of the queue is managed by a tail pointer 508 (504). A format of a command will be described below.

A CQ 502 is a queue in the form of a ring buffer generated in the RAM 204, and command processing completion notifications from the bridge apparatus 102 serving as the endpoint are stored in order in the SQ 502. A head element of the queue is managed by a head pointer 509 (505), and a tail element of the queue is managed by a tail pointer 510 (506).

In the SQ 501, commands are stored in the queue at a position sandwiched by the head pointer 507 and the tail pointer 508. In the CQ 502, command processing completion notifications are stored in the queue at a position sandwiched by the head pointer 509 and the tail pointer 510. The head pointer and the tail pointer being at the same position means that the queue is empty. In the example illustrated in FIG. 5A, the commands and the command processing completion notifications are stored in hatched portions.

Assume that a memory space allocated to each of the SQ and the CQ is statically determined. At the time of the start of the system, the CPU 201 reserves the memory space of each of the SQ and the CQ, and shares information of the memory space of each of the SQ and the CQ with the bridge apparatus 102 by an administrator command. However, the configuration is not limited thereto.

<Description of Block Configuration of Bridge Apparatus 102>

FIG. 3 is a detailed block diagram of the bridge apparatus 102.

The bridge apparatus 102 includes a sub CPU 301, a PCIe-IF 302, a PCIe-IF 303, a PCIe-IF 304, a ROM 305, and a RAM 306. The bridge apparatus 102 is connected to the HC 101 via the PCIe-IF 302, and is connected to the first storage apparatus 103 and the second storage apparatus 104 via the PCIe-IF 303 and the PCIe-IF 304, respectively.

The sub CPU 301 controls access of the HC 101 to the first storage apparatus 103 and the second storage apparatus 104 based on a control program or the like stored in the ROM 305. Furthermore, the sub CPU 301 generates a command set for each storage apparatus based on a command set received from the HC 101.

The PCIe-IF 302 exchanges data to be transmitted and received with the HC 101, the HC 101 serving as a root complex. The PCIe-IF 302 includes registers, a submission queue tail doorbell (SQTD) 307 and a completion queue head doorbell (CQHD) 308. These registers store information of the tail pointer 504 for the SQ 501 and information of the head pointer 505 for the CQ 502 of the HC 101.

The PCIe-IF 303 exchanges data to be transmitted and received with the first storage apparatus 103, the first storage apparatus 103 serving as the endpoint, and the PCIe-IF 304 exchanges data to be transmitted and received with the second storage apparatus 104, the second storage apparatus 104 serving as the endpoint.

The ROM 305 is a non-volatile memory, and stores therein a boot program for the bridge apparatus 102, a control program, and the like.

Figure 5B:
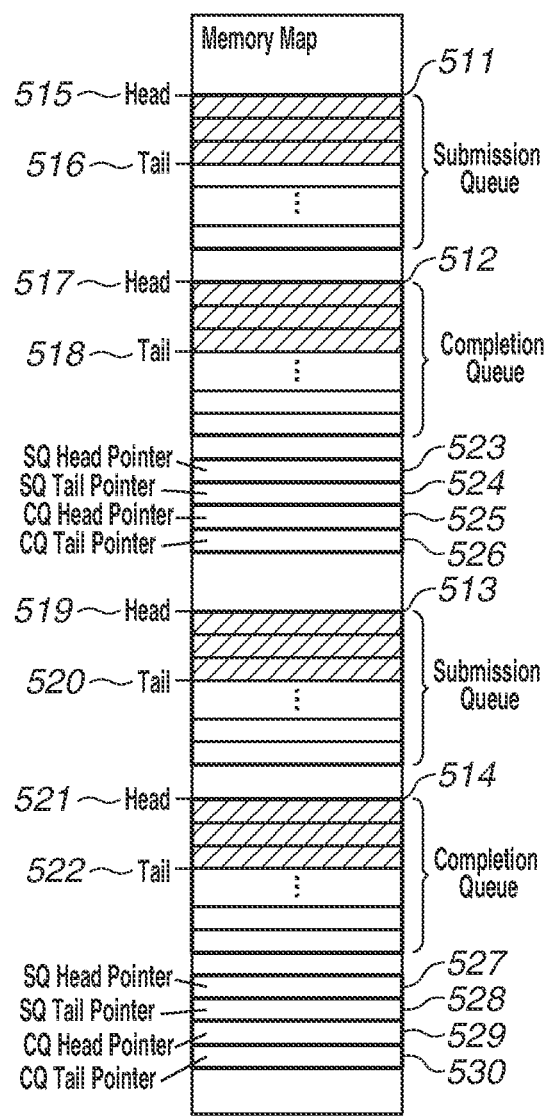

The RAM 306, which is a memory such as a DRAM, temporarily stores therein data, and functions as a work memory. FIG. 5B illustrates an example of a memory map (holding area) of the RAM 306. A memory space of the RAM 306 includes two sets of an SQ and a CQ (SQ 511, SQ 513, CQ 512, and CQ 514), which are used by the NVMe protocol. The SQ 511 and the CQ 512 are used for NVMe transfer to the first storage apparatus 103. The SQ 513 and the CQ 514 are used for NVMe transfer to the second storage apparatus 104.

The SQ 511 is a queue in the form of a ring buffer generated in the RAM 306. To exchange NVMe commands, the sub CPU 301 stores commands in order in the SQ 511 based on contents of the commands in the SQ 501. A head element of the queue is managed by a head pointer 523 (515), and a tail element of the queue is managed by a tail pointer 524 (516).

A CQ 512 is a queue in the form of a ring buffer generated in the RAM 306, and command processing completion notifications from the first storage apparatus 103 serving as an endpoint are stored in order in the CQ 512. A head element of the queue is managed by a head pointer 525 (517), and a tail element of the queue is managed by a tail pointer 526 (518).

A head pointer 527 (519) for the SQ 513, a tail pointer 528 (520) for the SQ 513, a head pointer 529 (521) for the CQ 514, and a tail pointer 530 (522) for the CQ 514 are used for NVMe transfer to the second storage apparatus 104. Except for the point described above, each queue and each pointer for the second storage apparatus 104 play a similar role to that of each queue and each pointer for the first storage apparatus 103, and thus a description thereof is omitted here.

In the example illustrated in FIG. 5B, the commands or the command processing completion notifications are stored in hatched portions.

Assume that a memory space allocated to each of the SQ and the CQ is statically determined. At the time of the start of the system, the sub CPU 301 reserves the memory space for each of the SQ and the CQ, and shares information of the memory space of each of the SQ and the CQ with the first storage apparatus 103 and the second storage apparatus 104 by an administrator command. However, the configuration is not limited thereto.

<Description of Block Configuration of First Storage Apparatus 103 and Second Storage Apparatus 104>

FIG. 4 is a detailed block diagram of the first storage apparatus 103 and the second storage apparatus 104. A configuration of the first storage apparatus 103 will be described as an example here.

The first storage apparatus 103 includes an SSD controller 401, a PCIe-IF 402, a DRAM 403, and a NAND flash (registered trademark) 404. The first storage apparatus 103 is connected to the bridge apparatus 102 via the PCIe-IF 402.

The SSD controller 401 includes a processor that processes software executed in the first storage apparatus 103, a DRAM controller that controls the DRAM 403, and a NAND flash controller that controls the NAND flash 404.

The PCIe-IF 402 exchanges data to be transmitted and received with the bridge apparatus 102, the bridge apparatus 102 serving as a root complex. The PCIe-IF 402 incorporates registers, an SQTD 405 and a CQHD 406. These registers store information of the bridge apparatus 102, that is, information of the tail pointer 516 for the SQ 511 and information of the head pointer 517 for the CQ 512.

The DRAM 403 is a cache memory, and temporarily stores therein data before the data is written in the NAND flash 404.

The NAND flash 404 is a device that actually records data, and performs writing of the data.

Since the second storage apparatus 104 has a configuration similar to that of the first storage apparatus 103, a description of the second storage apparatus 104 is omitted.

<Description of Format of NVMe Command>

Figure 7:
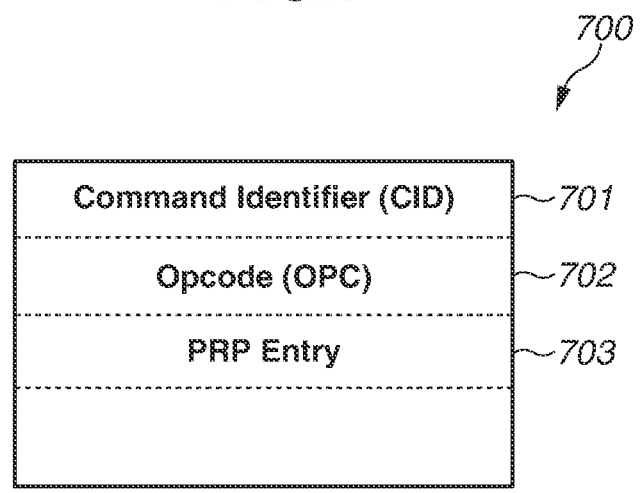
FIG. 7 is a command format diagram according to one embodiment.

A format of an NVMe command will now be described. An NVMe command 700 illustrated in FIG. 7 includes a field of a command identifier (hereinafter referred to as a CID) 701, a field of an opcode (hereinafter referred to as an OPC) 702, and a field of a physical region page (PRP) entry 703.

The CID 701 is a unique number added to the command. The OPC 702 is an identifier indicating a command type, such as an identifier for write and an identifier for read. Information indicating an address of a transfer source or an address of a transfer destination is stored in the PRP entry 703.

Transmission and reception of the command in the information processing system according to the present example embodiment will now be described.

<Description of Outline of Processing Operations Regarding NVMe Transfer>

The CPU 201 creates the NVMe command to have input/output (IO) access to the first storage apparatus 103 using the NVMe protocol. The CPU 201 creates NVMe commands, and then stores the NVMe commands in order in the SQ501 in the RAM 204.

The CPU 201 updates the tail pointer 508 for the SQ 501 every time an NVMe command is stored, and updates the tail pointer 504 at the tail position of the NVMe commands stored in the SQ 501. When the tail pointer 508 is updated, the CPU 201 writes a value of the tail pointer 508 for the SQ 501 in the SQTD 307 of the bridge apparatus 102 to notify the bridge apparatus 102 that the NVMe command is newly stored. With this configuration, the sub CPU 301 of the bridge apparatus 102 starts operations for executing the NVMe commands stored in the SQ 501. Operations of the bridge apparatus 102 will be described below.

When accepting a completion interrupt indicating that execution of all the commands has been completed, the CPU 201 refers to command execution results stored in the CQ 502 and can thereby know whether the commands have been executed normally. With the flow described above, the CPU 201 performs control of writing to/reading from the storage apparatus.

<Description of Flow of Processing Executed by Bridge Apparatus 102 Regarding Transmission/Reception of NVMe Command>

Figure 6:
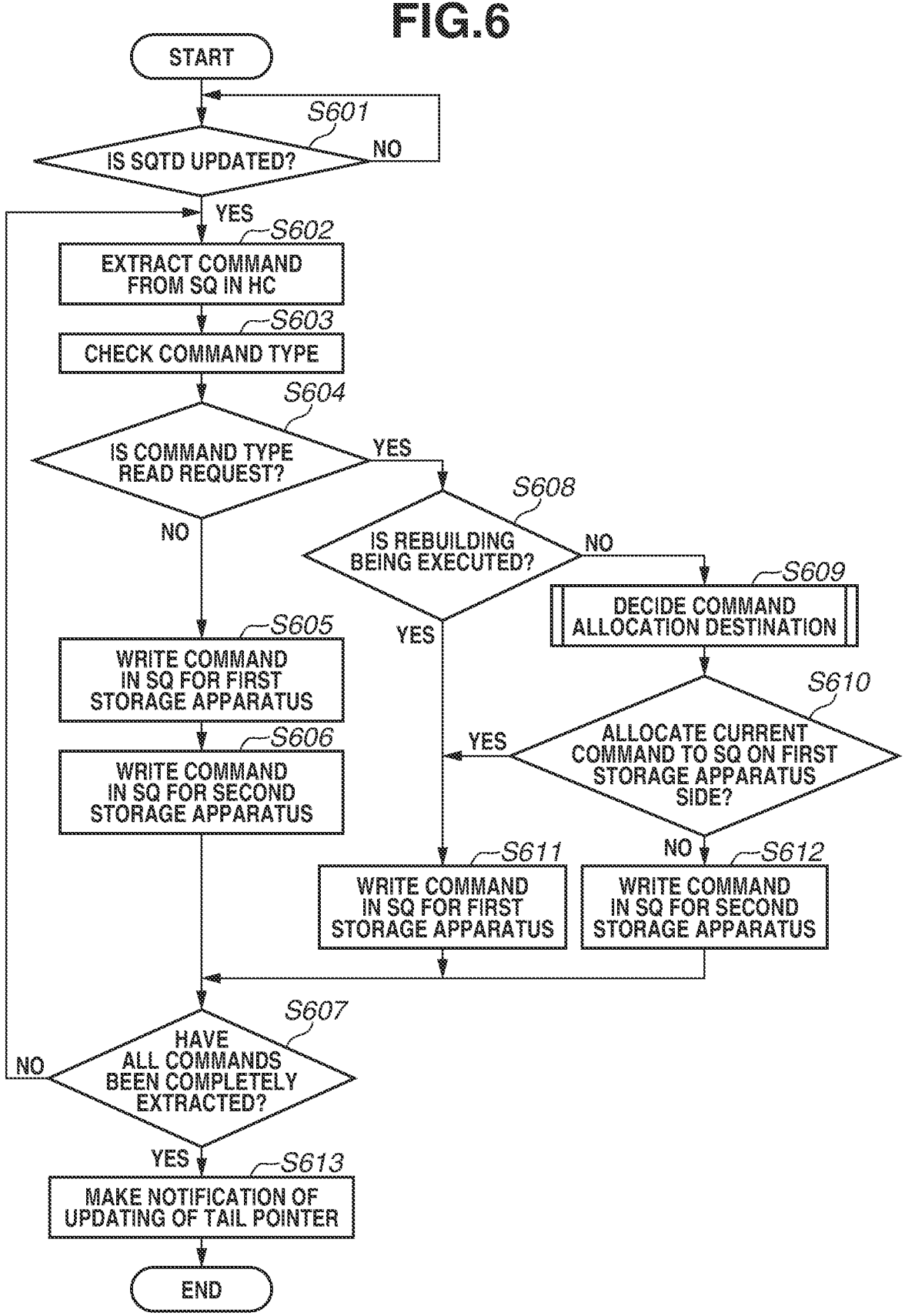
FIG. 6 is a flowchart illustrating the flow of processing executed by the bridge apparatus to extract a command set from the HC according to one embodiment.

Processing executed by the sub CPU 301 to store the NVMe commands in the SQ 511 and SQ 513 in the bridge apparatus 102 will be described in detail using the flowchart in FIG. 6.

In the present example embodiment, a description will be given of an implementation configuration in which the sub CPU 301 simultaneously executes two threads. A first thread is processing of the flowchart in FIG. 6. A second thread is processing of the flowchart in FIG. 12. However, the implementation is not limited thereto.

In step S601, the sub CPU 301 checks whether a new NVMe command is stored in the SQ 501 of the HC 101 as a result of the updating of a value in the SQTD 307. Assume that the sub CPU 301 is notified of the updating of the value in the SQTD 307 by an interrupt. If the value in the SQTD 307 is updated (YES in step S601), the processing proceeds to step S602. If the value in the SQTD 307 is not updated (NO in step S601), the processing remains in step S601.

In step S602, the sub CPU 301 reads NVMe commands prepared on the HC 101 from the SQ 501, and extracts the NVMe commands one by one. The sub CPU 301 reads a command from a memory space indicated by the head pointer for the SQ 501. The sub CPU 301 is notified of an initial value of the head pointer for the SQ 501 by the HC 101 at the time of the start of the system as described above. The value of the head pointer is managed by a mechanism in which the value of the head pointer is updated with a value of the tail pointer when a sequence of NVMe transfer is completed.

In step S603, the sub CPU 301 determines a command type of the extracted command (e.g., write and read). The determination of the command type can be made by checking the OPC 702 in the NVMe command 700. The command type determined herein is utilized in subsequent processing in step S604.

In step S604, the sub CPU 301 determines whether the command type of the extracted NVMe command is a read request. In a case where the command type is the read request (YES in step S604), the processing proceeds to step S608. In a case where the command type is a write request (NO in step S604), the processing proceeds to step S605. The read request is, for example, a request for reading image data stored in the storage apparatus at the time of printing using the printer 208. The write request is, for example, a request for storing image data generated by the scanner 207 in the storage apparatus.

In step S605, the sub CPU 301 writes the extracted write command in the SQ 511 which is a queue for the first storage apparatus 103. This is memory copy processing. The sub CPU 301 writes the command in a memory space indicated by the tail pointer for the SQ 511. An initial value of the tail pointer for the SQ 511 is a value of the head pointer for the SQ 511. The value of the tail pointer is incremented by the sub CPU 301 writing one command. At the same time, the value of the tail pointer for the CQ 512 is also incremented.

In addition, the sub CPU 301 writes a value of the CQ pointer corresponding to the command type that has been written in a command management table for the first storage apparatus 801. An example of the command management table for the first storage apparatus 801 will be described with reference to FIG. 8. There are two command management tables, one for the first storage apparatus and the other for the second storage apparatus. The command management tables have an identical table configuration. The command management table for the first storage apparatus will be described as a typical example. The table includes elements of a command type and a CQ pointer.

The command type indicates information of read or write of the written command. The CQ pointer is a pointer indicating a write destination at the time of writing a response result of the command in the CQ 502 of the HC 101. This table information enables appropriate return of the response result to the HC 101 when the command is allocated.

In step S606, the sub CPU 301 writes the extracted write command in the SQ 513 which is a queue for the second storage apparatus. This is memory copy processing. The sub CPU 301 writes the command in a memory space indicated by the tail pointer for the SQ 513.

An initial value of the tail pointer for the SQ 513 is a value of the head pointer for the SQ 513. The value of the tail pointer is incremented by the sub CPU 301 writing one command. At the same time, a value of the tail pointer for the CQ 514 is also incremented. In addition, the sub CPU 301 writes a value of the CQ pointer corresponding to the command type with which writing is performed to a command management table for the second storage apparatus 802.

In step S607, the sub CPU 301 determines whether all the NVMe commands prepared in the SQ 501 on the HC 101 have been completely extracted. The sub CPU 301 checks a value indicated by the pointer for the SQ 501 and a value of the SQTD 307, which are referred to when extracting the commands. If the values are identical, the sub CPU 301 can determine that a final command stored in the SQ 501 has been extracted. In a case where all the commands have been extracted (YES in step S607), the processing proceeds to step S613. In a case where a command still remains (NO in step S607), the processing returns to step S602. In step S602, the sub CPU 301 extracts a command again.

In step S608, the sub CPU 301 determines whether rebuilding of the second storage apparatus 104 is being executed. In a case where the rebuilding is being executed (YES in step S608), the processing proceeds to step S611. In a case where the rebuilding is not being executed (NO in step S608), the processing proceeds to step S609. The reason that step S608 is necessary is as follows. In a case where the rebuilding is being executed, the information processing system 1 is in a state where a value of data stored in the second storage apparatus 104 being identical to a value of data in the first storage apparatus is not guaranteed. That is, the information processing system 1 is in a state where data read out from the second storage apparatus 104 being a correct value cannot be guaranteed. Hence, the sub CPU 301 determines whether the second storage apparatus 104 is available at the time of processing a read command by checking an execution state of rebuilding.

The rebuilding indicates rebuilding control of a mirroring configuration, which is control of reading out data stored in one of storage apparatuses and storing the data in the other of the storage apparatuses. The rebuilding control includes a case of performing reading out and writing in correspondence with a partial storage area and a case of performing reading out and writing in correspondence with all of partial storage areas. The rebuilding control is, for example, control of making a transition from the mirror control via degrading (a state where one of the storage apparatuses is broken).

Figure 11:
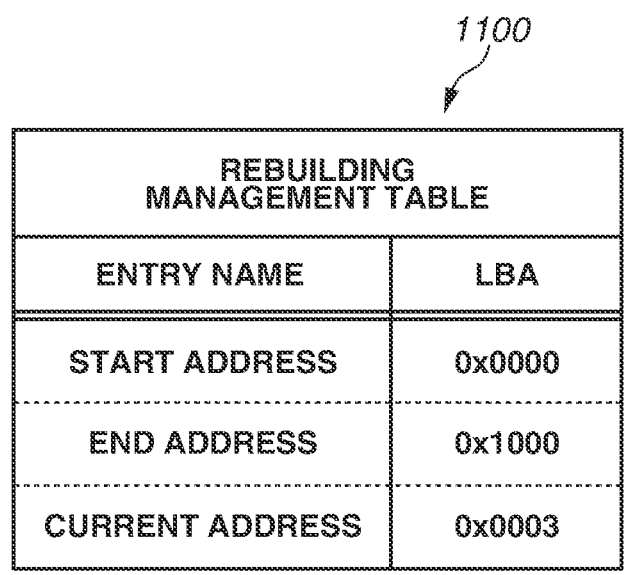
FIG. 11 is a rebuilding management table according to one embodiment.

A method of determining whether the rebuilding is being executed will now be described. FIG. 11 is a rebuilding management table. The rebuilding management table manages a rebuilding execution state, and includes a start address, end address, and current address of a rebuilding area as entries of the table. Rebuilding processing is processing, execution of which is triggered by the sub CPU 301 detecting connection with a new storage.

The sub CPU 301 copies all areas of the first storage apparatus 103 or only an area in use of the first storage apparatus 103 to the second storage apparatus 104. The sub CPU 301 issues a read command to the first storage apparatus 103, and issues a write command to the second storage apparatus 104 based on readout data. Assume that a start address, end address, and current address of an area to be copied is managed by the rebuilding management table illustrated in FIG. 11.

In the example illustrated in FIG. 11, a logical block addressing (LBA) value serving as the start address is 0x0000, and an LBA value serving as the end address is 0x1000. An LBA value serving as the current address is 0x0003. The current address indicates an address of an area from the start address to the end address, and thus indicates the rebuilding is being executed.

Alternatively, the sub CPU 301 may make determination by further referring to a read address of the extracted read command. With the determination routine described above, the sub CPU 301 can determine whether a target read area itself is before being subjected to rebuilding or after being subjected to rebuilding. The sub CPU 301 may determine that the rebuilding is not being executed if the target read area itself is the area after subjected to rebuilding.

In step S609, the sub CPU 301 decides an allocation destination of the extracted read command. The allocation destination is either the first storage apparatus 103 or the second storage apparatus 104. An allocation method will be described below.

In step S610, the sub CPU 301 determines whether to allocate the extracted read command to the first storage apparatus 103. Since the allocation destination has been already decided in step S609, the sub CPU 301 simply makes determination with respect to the decided content, and performs processing of a branching step. In a case where the sub CPU 301 determines that the read command is to be allocated to the first storage apparatus 103 (YES in step S610), the processing proceeds to step S611. In a case where the sub CPU 301 determines that the read command is to be allocated to the second storage apparatus 104 (NO in step S610), the processing proceeds to step S612.

In step S611, the sub CPU 301 writes the extracted read command in the SQ 511 which is the queue for the first storage apparatus 103. This is memory copy processing. As described above, the sub CPU 301 updates the tail pointers for the SQ 511 and the CQ 512, and also writes the command type and the value of the CQ pointer in the command management table for the first storage apparatus 801. When performing writing, the sub CPU 301 interrupts the rebuilding control and then performs the writing.

In step S612, the sub CPU 301 writes the extracted read command in the SQ 513 which is a queue for the second storage apparatus 104. This is memory copy processing. As described above, the sub CPU 301 updates the tail pointers for the SQ 513 and the CQ 514, and also writes the command type and the value of the CQ pointer in the command management table for the second storage apparatus 802.

In step S613, the sub CPU 301 makes a notification of the updating of the tail pointer. This is to notify another thread that operates in the sub CPU 301. As the simplest mechanism, there is a method of performing synchronization between threads using a predetermined variable. However, the configuration is not limited thereto.

<Description of Command Allocation Method when Bridge Apparatus 102 Transmits/Receives NVMe Command>

Figure 9:
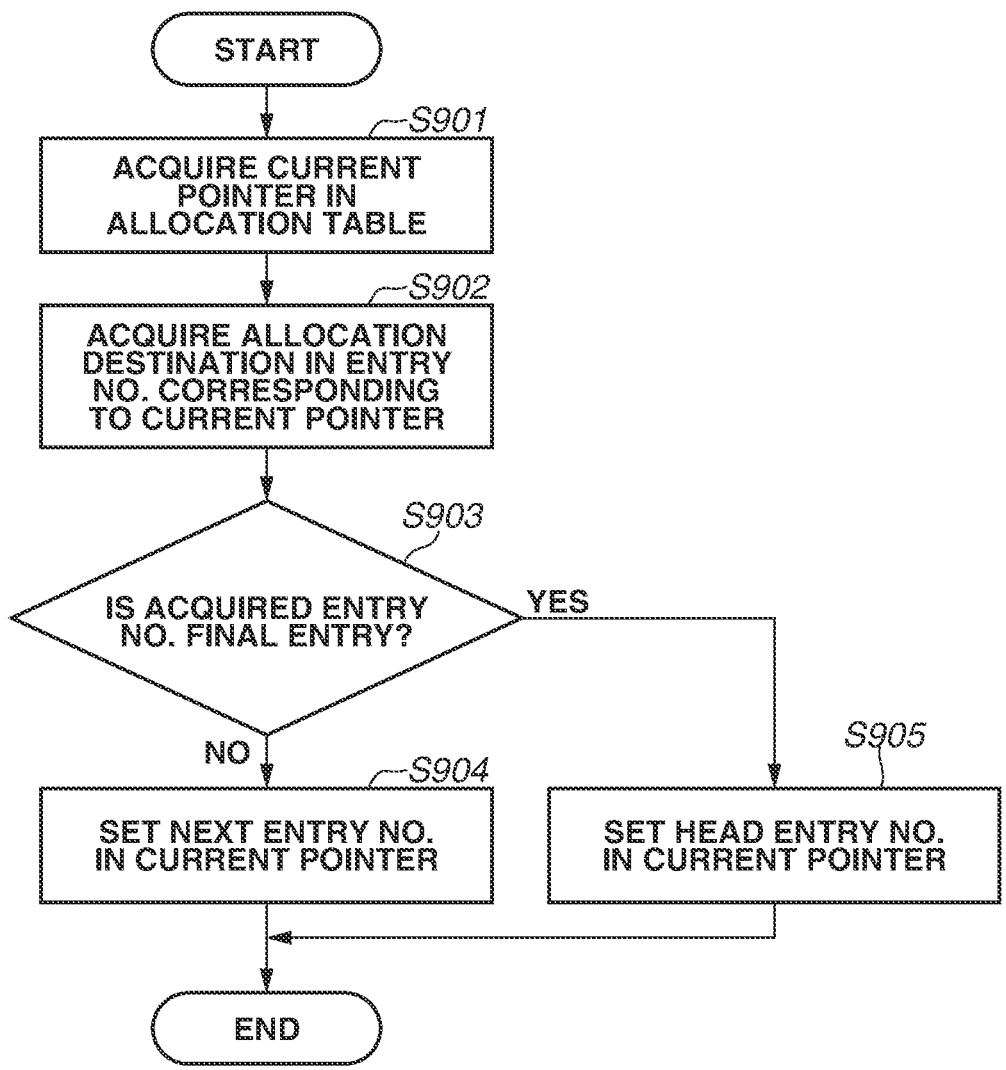
FIG. 9 is a flowchart of processing executed by the bridge apparatus to allocate a read command according to one embodiment.
Figure 10:
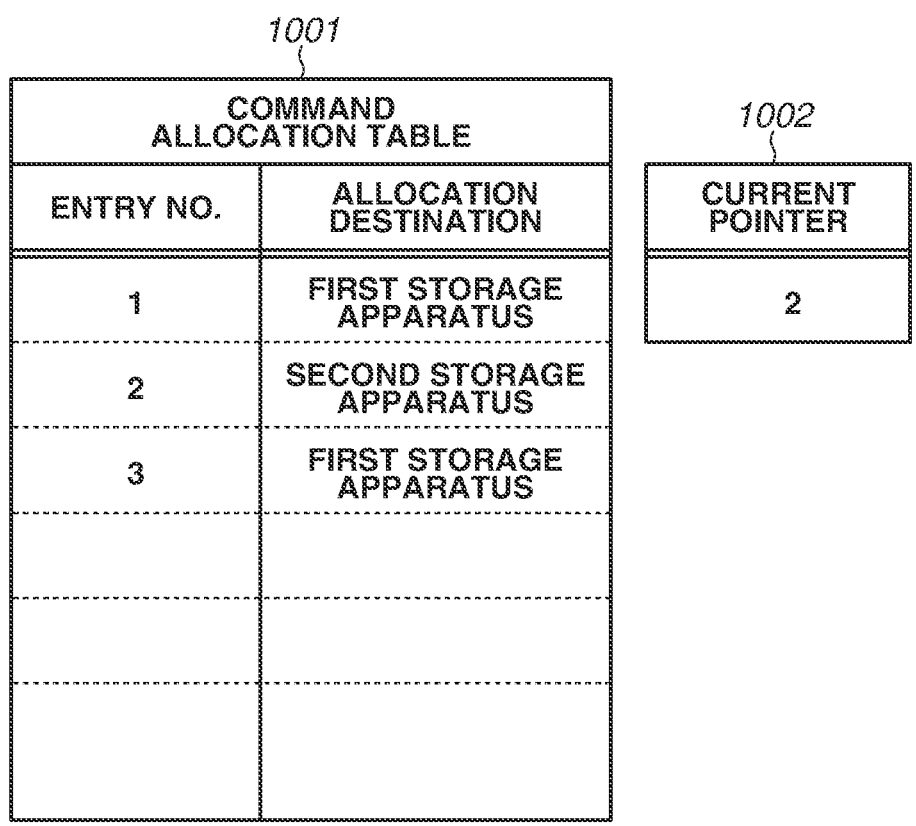
FIG. 10 is a command allocation table according to one embodiment.

Command allocation processing executed by the sub CPU 301 in step S609 will be described with reference to FIGS. 9 and 10.

In step S901, the sub CPU 301 acquires a current pointer in a command allocation table. An example of the command allocation table is illustrated in FIG. 10. Assume that the command allocation table is preset before the processing in step S901, such as at the time of start of the system.

This table is a table 1001 indicating to which of the first storage apparatus 103 and the second storage apparatus 104 the read command is allocated in the case of the read command, and is composed of elements of an entry number (No.), an allocation destination, and a current pointer 1002.

Setting the command allocation table can be considered as follows. First, the sub CPU 301 decides a read command allocation ratio between the first storage apparatus 103 and the second storage apparatus 104. In the example illustrated in FIG. 10, the sub CPU 301 decides the ratio as 1 to 1 between the first storage apparatus 103 and the second storage apparatus 104. An example of prioritizing the first storage apparatus 103 serving as a master is described here, but the sub CPU 301 may prioritize the second storage apparatus 104 serving as a slave.

Subsequently, the sub CPU 301 alternately adds the first storage apparatus 103 and the second storage apparatus 104 to entries of the table based on the decided ratio. In a case where the ratio is 1 to 1 like the example described above, the sub CPU 301 adds the first storage apparatus 103 as an allocation destination to the first entry, adds the second storage apparatus 104 as an allocation destination to the second entry, and adds the first storage apparatus 103 as an allocation destination to the final entry. The sub CPU 301 adds alternately in this manner, and creates the table in accordance with the allocation ratio. The current pointer indicates an entry No. to which allocation is currently being made, and is set to indicate an initial value of 1 at the time of setting the table.

While an example of creating the table based on the decided ratio is described here, the sub CPU 301 may have a table in which an allocation destination has been decided for each of a plurality of entry Nos. Also in this case, an initial value of the current point is 1.

In step S902, the sub CPU 301 acquires an allocation destination in an entry No. corresponding to the acquired current pointer from the command management table. With this processing, the sub CPU decides an allocation destination of the current read command. In the example illustrated in FIG. 10, since a value of the current pointer is 2, the allocation destination becomes the second storage apparatus 104 that has been set to the entry No. 2.

In step S903, the sub CPU 301 determines whether the acquired entry No. is the final entry of the table. This can be easily achieved by making comparison with the maximum value of the entry Nos. in the table. In a case where the acquired entry No. is the final entry (YES in step S903), the processing proceeds to step S905. In a case where the acquired entry No. is not the final entry (NO in step S903), the processing proceeds to step S904.

In step S904, the sub CPU 301 sets a value of the next entry No. in the current pointer. In the present example embodiment, the value is an incremented value.

In step S905, the sub CPU 301 sets a value of the head entry No. in the current pointer. In the present example embodiment, the value is 1.

In this manner, the sub CPU 301 is configured to allocate commands, but the method is not limited thereto. For example, the sub CPU 301 may be configured to decide the ratio of 1 to 1 by prioritizing the first storage apparatus 103 serving as the master. In this case, the sub CPU 301 sets the next entry No. in the current pointer in step S905 similarly to the processing in step S904.

If a usage rate of the first storage apparatus 103 and that of the second storage apparatus 104 are almost equal, the ratio of 1 to 1 is a ratio with which the bridge apparatus 102 can efficiently perform transfer. In contrast, in a case where the first storage apparatus 103 is a new storage apparatus and the second storage apparatus 104 is an old storage apparatus, the bridge apparatus 102 can perform transfer more efficiently by making the ratio of the first storage apparatus 103 higher, for example, the ratio of 2 to 1. The sub CPU 301 may be configured to switch the ratio between the first storage apparatus 103 and the second storage apparatus 104 in accordance with a data transfer rate of the first storage apparatus 103 and that of the second storage apparatus 104.

<Description of Flow of Processing of Responding to NVMe Command Executed by Bridge Apparatus 102>

The processing flow after the NVMe commands are stored in the SQ 511 and the SQ 513 of the bridge apparatus 102 will now be described with reference to FIG. 12.

In step S1201, the sub CPU 301 determines whether notification of the updating of the tail pointer has been made. The notification control is as described in step S613. In a case where the sub CPU 301 detects the notification of the updating (YES in step S1201), the processing proceeds to step S1202.

In step S1202, the sub CPU 301 determines whether there is an NVMe command that is to be processed by the first storage apparatus 103. An example of a determination method is as follows. The sub CPU 301 checks a difference between the head pointer 523 for the SQ 511 and the tail pointer 524 for the SQ 511. If there is a difference in value between the pointers, the sub CPU 301 determines that a new NVMe command is stored. If the NVMe command is stored (YES in step S1202), the processing proceeds to step S1203. If no new NVMe command is stored (NO in step S1202), the processing proceeds to step S1204. However, the method is not limited to thereto.

In step S1203, the sub CPU 301 notifies the first storage apparatus 103 that a new NVMe command is stored in the SQ 511. This is achieved by the sub CPU 301 writing a value of the tail pointer 524 for the SQ 511 in the SQTD 405 of the first storage apparatus 103 and making a doorbell notification.

With the doorbell notification, the SSD controller 401 of the first storage apparatus 103 takes the initiative in extracting NVMe commands. The first storage apparatus 103 performs processing in accordance with contents of the extracted commands. Every time the processing of each command is completed, a command processing completion notification is written in the CQ 512. When completing the processing of all the commands to be executed in the first storage apparatus 103, the first storage apparatus 103 notifies the bridge apparatus 102 of the completion by a completion interrupt.

The extraction of the NVMe commands means that the SSD controller 401 grasps the number of commands by receiving the doorbell notification, and acquires detail information of each command from the sub CPU 301. The detail information of each command is, for example, a command type, and information regarding LBA of an access destination. That is, the sub CPU 301 transmits the doorbell notification to the first storage apparatus 103, and thereafter transmits the detail information of each command to the first storage apparatus 103. In the following description, assume that the operations described above are performed between each storage apparatus and the bridge apparatus 102 to extract the NVMe commands.

In step S1204, the sub CPU 301 determines whether there is an NVMe command that is to be processed by the second storage apparatus 104. An example of this determination method is as follows. The sub CPU 301 checks a difference between the head pointer 527 for the SQ 513 and the tail pointer 528 for the SQ 513. If there is a difference in value between the pointers, the sub CPU 301 determines that a new NVMe command is stored. If the NVMe command is stored (YES in step S1204), the processing proceeds to step S1205. If no new NVMe command is stored (NO in step S1204), the processing proceeds to step S1206. However, the method is not limited to thereto.

In step S1205, the sub CPU 301 notifies the second storage apparatus 104 that the new NVMe command is stored in the SQ 513. This is achieved by the sub CPU 301 writing a value of the tail pointer 528 for the SQ 513 in an SQTD 411 of the second storage apparatus 104 and making a doorbell notification. With the doorbell notification, the SSD controller 407 of the second storage apparatus 104 takes the initiative in extracting NVMe commands. The second storage apparatus 104 performs processing in accordance with contents of the extracted commands. Every time the processing of each command is completed, a command processing completion notification is written in the CQ 514 on the second storage apparatus 104 side in the bridge apparatus 102. When completing the processing on all the commands, the second storage apparatus 104 notifies the bridge apparatus 102 of the completion by a completion interrupt In step S1206, the sub CPU 301 determines whether there is an NVMe command that the first storage apparatus 103 has been requested to process. This determination can be made by the same method as that performed in step S1202, and thus the same discrimination result as that in step S1202 is obtained. Although the processing in step S1206 overlaps with the processing in step S1202, this step is incorporated here so that a step for waiting for completion of processing of the first storage apparatus 103 is incorporated as necessary. If there is the command that the first storage apparatus 103 has been requested to process (YES in step S1206), the processing proceeds to step S1207. Otherwise (NO in step S1206), the processing proceeds to step S1209.

In step S1207, the sub CPU 301 checks whether the completion interrupt has been issued from the first storage apparatus 103. If the completion interrupt has been issued (YES in step S1207), the processing proceeds to step S1208. If no completion interrupt has been issued (NO in step S1207), the processing remains in step S1207. The sub CPU 301 then waits for the completion interrupt from the first storage apparatus 103.

In step S1208, the sub CPU 301 stores the command processing completion notification from the first storage apparatus 103, which has been stored in the CQ 512, in the CQ 502 in the HC 101.

When performing this processing, the sub CPU 301 refers to information in the command management table for the first storage apparatus 801 created in steps S605 and S611. The sub CPU 301 can grasp a correspondence relation between the CQ 512 and the CQ 502 based on a value of the CQ pointer stored in the table. The sub CPU 301 stores each command processing completion notification stored in the CQ 512 at a corresponding position in the queue of the CQ 502.

Regarding this processing, the correspondence relation between the CQ 512 and the CQ 502 based on the example in FIG. 8 is illustrated in FIGS. 13A and 13B. FIG. 13A illustrates a memory space in the RAM 204, and FIG. 13B illustrates a memory space in the RAM 306. Identifiers (502 and the like) illustrated in FIGS. 13A and 13B are those that have been already described, and thus a description thereof is omitted here.

A storage destination of the first command processing completion notification in the CP 512 is determined from a value of the CQ pointer in the first entry in the command management table for the first storage apparatus 801, and is at the head position in the CQ 502.

Similarly, a storage destination of the second command processing completion notification in the CP 512 is determined from a value of the CQ pointer in the second entry in the command management table for the first storage apparatus 801, and is positioned at the head+2 in the CQ 502.

Similarly, a storage destination of the third command processing completion notification in the CP 512 is determined from a value of the CQ pointer in the third entry in the command management table for the first storage apparatus 801, and is positioned at the head+3 in the CQ 502. A value indicating the position of the head+3 is also present in the command management table for the second storage apparatus 802. In a case of where values overlap, the sub CPU 301 needs to store appropriate notification results in consideration of processing results of two commands. The sub CPU 301 stores results in the CQ 512 in the CQ 502 by the method described above.

In a case where the command processing completion notification includes an error, the sub CPU 301 performs a retry. In a case of making write access, the sub CPU 301 makes a retry on the same storage apparatus a predetermined number of times. In a case of making read access, the sub CPU 301 performs control to make a retry on a storage apparatus that is different from a storage apparatus in which an error has occurred. However, the control is not limited thereto. The sub CPU 301 may perform control to make a retry on the same storage apparatus also in the case of making read access.

In step S1209, the sub CPU 301 determines whether there is an NVMe command that the second storage apparatus 104 has been requested to process. This determination can be made by the same method as that in step S1204, and thus the same discrimination result as that in step S1204 is obtained. Although the processing in step S1209 overlaps with the processing in step S1204, this step is incorporated here so that a step for waiting for completion of processing of the second storage apparatus 104 is incorporated as necessary. If there is a command that the second storage apparatus 104 has been requested to process (YES in step S1209), the processing proceeds to step S1210. Otherwise (NO in step S1209), the processing proceeds to step S1212.

In step S1210, the sub CPU 301 checks whether the completion interrupt has been issued from the second storage apparatus 104. If the completion interrupt has been issued (YES in step S1210), the processing proceeds to step S1211. If no completion interrupt has been issued (NO in step S1210), the processing remains in step S1210. The sub CPU 301 then waits for the completion interrupt from the second storage apparatus 104.

In step S1211, the sub CPU 301 stores the command processing completion notification from the second storage apparatus 104, which has been stored in the CQ 514, in the CQ 502 in the HC 101. This processing can be performed by the same method as that in the processing in step S1208, and thus a description thereof is omitted here.

In step S1212, the sub CPU 301 notifies the HC 101 of completion of the command processing. This notification guarantees the HC 101 that writing of all the command processing completion results in the CQ 502 has been completed. The sub CPU 301 makes the notification using a command processing completion interrupt.

In step S1213, the sub CPU 301 performs end processing for the NVMe command processing. As the end processing, the sub CPU 301 updates values of various kinds of pointers for the next NVMe transfer. The updating is to overwrite values of head pointers (523, 525, 527, 529, 406, and 412) in the bridge apparatus 102, the first storage apparatus 103, and the second storage apparatus 104 with respective values of corresponding tail pointers.

As described above, the information processing system can improve read response and widen a read bandwidth by allocating read commands to a plurality of storage apparatuses connected via the bridge apparatus while maintaining the mirroring system with the NVMe protocol.

The information processing system has the configuration of performing control dynamically to allocate read commands to a storage apparatus at the time the read commands are received, and is thus capable of performing flexible allocation according to circumstances of the moment. In addition, the information processing system has the configuration of further determining whether rebuilding is being executed, thus control is performed to have read access to the second storage apparatus only when data stored in the second storage apparatus is guaranteed. Furthermore, since the bridge apparatus independently allocates the read commands, the present configuration can be implemented without the need for addition of processing by the host computer.

OTHER EMBODIMENTS

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2020-166331, filed Sep. 30, 2020, which is hereby incorporated by reference herein in its entirety.

What is claimed is:

1. A control apparatus that is connected to a host controller, a non-volatile first storage unit, and a non-volatile second storage unit, and that is configured to perform mirror control of the first storage unit and the second storage unit, the control apparatus comprising:
  a first acceptance unit configured to accept a plurality of readout requests in order from the host controller;
  a control unit configured to allocate in order the plurality of readout requests accepted by the first acceptance unit as a readout request corresponding to the first storage unit or a readout request corresponding to the second storage unit;
  a first transmission unit configured to transmit at least one readout request allocated as a readout request corresponding to the first storage unit to the first storage unit;

a second acceptance unit configured to accept, from the first storage unit, first data corresponding to the at least one readout request transmitted by the first transmission unit;

a second transmission unit configured to transmit at least one readout request allocated as a readout request corresponding to the second storage unit to the second storage unit;

a third acceptance unit configured to accept, from the second storage unit, second data corresponding to the at least one readout request transmitted by the second transmission unit; and a third transmission unit configured to transmit, to the host controller, the first data accepted by the second acceptance unit and the second data accepted by the third acceptance unit as data corresponding to the plurality of readout requests accepted by the first acceptance unit.

2. The control apparatus according to claim 1, further comprising:

a holding unit including a first holding area in which a plurality of readout requests accepted from the host controller is held and a second holding area in which a plurality readout requests accepted from the host controller is held, wherein a readout request allocated by the control unit is held in the first holding area or the second holding area, wherein the first transmission unit is configured to transmit at least one readout request held in the first holding area to the first storage unit, and wherein the second transmission unit is configured to transmit at least one readout request held in the second holding area to the second storage unit.

3. The control apparatus according to claim 1, wherein the control apparatus makes a transition from the mirror control to rebuilding control of reading out data stored in the first storage unit and storing the data in the second storage unit, and wherein, in a state of performing the rebuilding control, the control unit is configured to, in response to acceptance of a readout request from the host controller, process the readout request accepted from the host controller as a readout request corresponding to the first storage unit.

4. The control apparatus according to claim 1, wherein, in response to acceptance of a request from the host controller by the first acceptance unit, the control unit is configured to check a type of the request.

5. The control apparatus according to claim 4, wherein, on the basis of the request being a readout request, the control unit is configured to acquire an allocation ratio used when allocating the readout request as a readout request corresponding to the first storage unit or a readout request corresponding to the second storage unit.

6. The control apparatus according to claim 5, wherein, in a case where the allocation ratio is 1 to 1, the control unit is configured to prioritize the first storage unit over the second storage unit.

7. The control apparatus according to claim 2, wherein the holding unit includes a third holding area in which data is temporarily held, wherein the holding unit is configured to hold the first data accepted by the second acceptance unit in, out of the third holding area, an area based on the at least one readout request allocated as a readout request corresponding to the first storage unit, wherein the holding unit is configured to hold the second data accepted by the third acceptance unit in, out of the third holding area, an area based on the at least one readout request allocated as a readout request corresponding to the second storage unit, and wherein the third transmission unit is configured to transmit data held in a holding area of the host controller, based on an area in which data is held out of the third holding area.

8. An information processing system comprising a control apparatus that is connected to a host controller, a non-volatile first storage apparatus, and a non-volatile second storage apparatus, and that is configured to perform mirror control of the first storage apparatus and the second storage apparatus, wherein the host controller is configured to transmit a plurality of readout requests in order to the control apparatus, wherein the control apparatus is configured to accept the plurality of readout requests in order, and allocate in order the plurality of readout requests as a readout request corresponding to the first storage apparatus or a readout request corresponding to the second storage apparatus, wherein the first storage apparatus is configured to receive at least one readout request allocated as a readout request corresponding to the first storage apparatus, read out first data based on the at least one readout request, and transmit the first data to the control apparatus, wherein the second storage apparatus is configured to receive at least one readout request allocated as a readout request corresponding to the second storage apparatus, read out second data based on the at least one readout request, and transmit the second data to the control apparatus, wherein the control apparatus is configured to accept the first data from the first storage apparatus, accept the second data from the second storage apparatus, and transmit the first data and the second data to the host controller, and wherein the host controller is configured to accept the first data and the second data from the control apparatus.

9. The information processing system according to claim 8, wherein the control apparatus is configured to allocate a readout request of the accepted readout requests as a readout request corresponding to the first storage apparatus, thereby holding the readout request in a first holding area, allocate a readout request of the accepted readout requests as a readout request corresponding to the second storage apparatus, thereby holding the readout request in a second holding area, transmit the readout request held in the first holding area to the first storage apparatus, and transmit the readout request held in the second holding area to the second storage apparatus.

10. The information processing system according to claim 8, wherein the control apparatus is configured to check, in response to acceptance of a request from the host controller, a type of the request.

11. The information processing system according to claim 10, wherein, on the basis of the request being a readout request, the control apparatus is configured to acquire an allocation ratio used when allocating the readout request as a readout request corresponding to the first storage apparatus or a readout request corresponding to the second storage apparatus.

12. The information processing system according to claim 11, wherein, in a case where the allocation ratio is 1 to 1, the control apparatus is configured to prioritize the first storage apparatus over the second storage apparatus.

13. The information processing system according to claim 9,
- wherein the control apparatus includes a third holding area in which data is temporarily held,
- wherein the control apparatus is configured to hold the first data in, out of the third holding area, an area based on the at least one readout request allocated as a readout request corresponding to the first storage apparatus,
- wherein the control apparatus is configured to hold the second data in, out of the third holding area, an area based on the at least one readout request allocated as a readout request corresponding to the second storage apparatus, and
- wherein the control apparatus is configured to transmit data held in a holding area of the host controller, based on an area in which data is held.

14. The control apparatus according to claim 1, wherein the readout request is a command compliant with NVMe protocol.

15. The control apparatus according to claim 1, wherein the first storage unit and the second storage unit are NVMeSSD.

* * * * *